US009992742B2

(12) United States Patent
Zhang et al.

(10) Patent No.: US 9,992,742 B2
(45) Date of Patent: Jun. 5, 2018

(54) DISCONTINUOUS RECEPTION IN A WIRELESS DEVICE FOR IN-DEVICE COEXISTENCE

(75) Inventors: Yujian Zhang, Beijing (CN); Mo-Han Fong, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 61 days.

(21) Appl. No.: 13/997,223

(22) PCT Filed: Apr. 11, 2012

(86) PCT No.: PCT/US2012/033080
§ 371 (c)(1),
(2), (4) Date: Nov. 19, 2013

(87) PCT Pub. No.: WO2013/048571
PCT Pub. Date: Apr. 4, 2013

(65) Prior Publication Data
US 2015/0071179 A1  Mar. 12, 2015

Related U.S. Application Data

(60) Provisional application No. 61/542,086, filed on Sep. 30, 2011.

(51) Int. Cl.
*H04W 52/02*  (2009.01)
*H04W 48/16*  (2009.01)
(Continued)

(52) U.S. Cl.
CPC ........ *H04W 52/0222* (2013.01); *H04B 7/024* (2013.01); *H04B 7/0417* (2013.01);
(Continued)

(58) Field of Classification Search
CPC ............. H04W 52/04; H04W 52/0235; H04W 72/005; H04W 72/1215; H04W 72/0446
See application file for complete search history.

(56) References Cited

U.S. PATENT DOCUMENTS

2007/0287468 A1*  12/2007  Jeong ................... H04L 5/0053
                                                          455/452.2
2008/0186892 A1    8/2008  Damnjanovic
(Continued)

FOREIGN PATENT DOCUMENTS

CN     102075993 A     5/2011
WO     2013/048571 A1  4/2013

OTHER PUBLICATIONS

International Search Report and Written Opinion received for PCT application No. PCT/US2012/033080, dated Oct. 31, 2012, 11 pages.
(Continued)

*Primary Examiner* — Jackie Zuniga Abad
(74) *Attorney, Agent, or Firm* — Thorpe North & Western

(57) ABSTRACT

Technology for reducing coexistence interference in a multi-radio wireless device is disclosed. In one method, a determination is made if coexistence interference is occurring in the multi-radio device. The multi-radio device is then configured to not monitor physical downlink control channels for pending uplink transmissions in a wireless wide area network (WWAN) transceiver in the multi-radio device that occur during an unscheduled period of discontinuous reception (DRX).

7 Claims, 10 Drawing Sheets

(51) Int. Cl.
*H04B 7/06* (2006.01)
*H04B 7/0456* (2017.01)
*H04L 12/891* (2013.01)
*H04W 52/04* (2009.01)
*H04L 5/00* (2006.01)
*H04W 72/04* (2009.01)
*H04W 4/08* (2009.01)
*H04W 36/00* (2009.01)
*H04W 4/06* (2009.01)
*H04W 72/00* (2009.01)
*H04W 72/12* (2009.01)
*H04W 76/04* (2009.01)
*H04L 12/709* (2013.01)
*H04W 48/18* (2009.01)
*H04W 72/08* (2009.01)
*H04W 76/06* (2009.01)
*H04B 7/024* (2017.01)
*H04B 7/0417* (2017.01)
*H04W 52/14* (2009.01)
*H04W 84/04* (2009.01)
*H04W 52/54* (2009.01)
*H04L 12/18* (2006.01)
*H04L 25/02* (2006.01)
*H04W 28/10* (2009.01)
*H04W 52/24* (2009.01)
*H04W 52/36* (2009.01)
*H04W 48/12* (2009.01)

(52) U.S. Cl.
CPC ......... *H04B 7/0456* (2013.01); *H04B 7/0615* (2013.01); *H04B 7/0619* (2013.01); *H04L 5/0032* (2013.01); *H04L 5/0037* (2013.01); *H04L 45/245* (2013.01); *H04L 47/41* (2013.01); *H04W 4/06* (2013.01); *H04W 4/08* (2013.01); *H04W 36/0005* (2013.01); *H04W 48/16* (2013.01); *H04W 48/18* (2013.01); *H04W 52/0235* (2013.01); *H04W 52/04* (2013.01); *H04W 52/146* (2013.01); *H04W 72/005* (2013.01); *H04W 72/042* (2013.01); *H04W 72/0446* (2013.01); *H04W 72/082* (2013.01); *H04W 72/1215* (2013.01); *H04W 72/1278* (2013.01); *H04W 72/1294* (2013.01); *H04W 76/048* (2013.01); *H04W 76/064* (2013.01); *H04B 7/0613* (2013.01); *H04L 12/189* (2013.01); *H04L 25/0204* (2013.01); *H04W 28/10* (2013.01); *H04W 48/12* (2013.01); *H04W 52/244* (2013.01); *H04W 52/365* (2013.01); *H04W 52/54* (2013.01); *H04W 72/0426* (2013.01); *H04W 84/042* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/23* (2018.01); *Y02D 70/24* (2018.01); *Y02D 70/444* (2018.01)

(56) References Cited

U.S. PATENT DOCUMENTS

| | | |
|---|---|---|
| 2009/0316593 A1 | 12/2009 | Wang et al. |
| 2009/0318177 A1 | 12/2009 | Wang et al. |
| 2010/0188989 A1* | 7/2010 | Wing .................... H04L 43/065 370/252 |
| 2011/0212742 A1 | 9/2011 | Chen et al. |
| 2012/0207040 A1* | 8/2012 | Comsa .............. H04W 72/1215 370/252 |
| 2013/0051214 A1* | 2/2013 | Fong .................... H04W 24/10 370/216 |

OTHER PUBLICATIONS

3GPP TR 36.816, "Study on Signalling and Procedure for Interference Avoidance for In-Device Coexistence", Technical Specifications Group Radio Access Network; Evolved Universal Terrestrial Radio Access (E-UTRA), Sep. 2011, V11.1.0, Release 11, 44 pages, Vabonne, France.

Catt, "Difference Between the TDM Solution and LTE DRX", 3GPP TSG RAN WG2 R2-110206, Discussion and Decision, Jan. 2011, Meeting 72bis, Agenda 7.8.3, 4 pages, Dublin, Ireland.

Intel Corporation, "TDM Solutions for In-Device Coexistence", 3GPP TSG RAN WG2 R2-121730, Discussion and Decision, Mar. 2012, Meeting 77bis, Agenda 7.6.2.1, 2 pages, Jeju, Korea.

ZTE, "Discussion on the DRX Based TDM Approach", 3GPP TSG RAN WG2 R2-110266, Discussion and Decision, Jan. 2011, Meeting 72bis, Agenda 7.8.3, 6 pages, Dublin, Ireland.

* cited by examiner

```
-- ASN1START

DRX-AssistantData-r11 ::=    SEQUENCE {
    periodicity              ENUMERATED {
                             sf10, sf20, sf32, sf40, sf64, sf80, sf128, sf160 },
    schedulingPeriod         CHOICE {
        sf10                 INTEGER(1..9),
        sf20                 INTEGER(1..19),
        sf32                 INTEGER(1..31),
        sf40                 INTEGER(1..39),
        sf64                 INTEGER(1..63),
        sf80                 INTEGER(1..79),
        sf128                INTEGER(1..127),
        sf160                INTEGER(1..159)
    },
    validDuration            INTEGER(1..8)   OPTIONAL,        -- Need ON
}

-- ASN1STOP
```

FIG. 4b

| DRX-AssistantData-r11 field descriptions |
|---|
| *periodicity* |
| TDM pattern periodicity. Value sf10 means 10 subframes, sf20 means 20 subframes and so on. |
| *schedulingPeriod* |
| LTE scheduling period in unit of subframes. |
| *validDuration* |
| TDM pattern valid duration is *validDuration* * *periodicity*. |

FIG. 4c

```
ExtendedDRX-Config-r11 ::=              CHOICE {
    release                 NULL,
    setup                   SEQUENCE {
        onDurationTimer             ENUMERATED {
                            psf1, psf2, psf3, psf4, psf5, psf6,
                            psf8, psf10, psf20, psf30, psf40,
                            psf50, psf60, psf80, psf100,
                            psf200},
        ...
        drx-InactivityTimer         ENUMERATED {
                            psf1, psf2, psf3, psf4, psf5, psf6,
                            psf8, psf10, psf20, psf30, psf40,
                            psf50, psf60, psf80, psf100,
                            psf200, psf300, psf500, psf750,
                            psf1280, psf1920, psf2560, psf0-v1020,
                            spare9, spare8, spare7, spare6,
                            spare5, spare4, spare3, spare2,
                            spare1},
        drx-RetransmissionTimer     ENUMERATED {
                            psf1, psf2, psf4, psf6, psf8, psf16,
                            psf24, psf33},
        longDRX-CycleStartOffset    CHOICE {
            sf10                INTEGER(0..9),
            sf20                INTEGER(0..19),
            sf32                INTEGER(0..31),
            sf40                INTEGER(0..39),
            sf64                INTEGER(0..63),
            sf80                INTEGER(0..79),
            sf128               INTEGER(0..127),
            sf160               INTEGER(0..159),
            sf256               INTEGER(0..255),
            sf320               INTEGER(0..319),
            sf512               INTEGER(0..511),
            sf640               INTEGER(0..639),
            sf1024              INTEGER(0..1023),
            sf1280              INTEGER(0..1279),
            sf2048              INTEGER(0..2047),
            sf2560              INTEGER(0..2559)
        },
        shortDRX                SEQUENCE {
            shortDRX-Cycle              ENUMERATED {
                            sf2, sf5, sf8, sf10, sf16, sf20,
                            sf32, sf40, sf64, sf80, sf128, sf160,
                            sf256, sf320, sf512, sf640},
            drxShortCycleTimer          INTEGER (1..16)
        }   OPTIONAL,                                   -- Need OR
        validDuration           INTEGER(1..8)  OPTIONAL      -- Need ON
    }
}

-- ASN1STOP
```

FIG. 4d

```
ExtendedDRX-Config-r11 ::=              CHOICE {
   release                 NULL,
   setup                   SEQUENCE {
      onDurationTimer              ENUMERATED {
                                   psf1, psf2, psf3, psf4, psf5, psf6,
                                   psf8, psf10, psf20, psf30, psf40,
                                   psf50, psf60, psf80, psf100,
                                   psf200},
      ...
      drx-InactivityTimer          ENUMERATED {
                                   psf1, psf2, psf3, psf4, psf5, psf6,
                                   psf8, psf10, psf20, psf30, psf40,
                                   psf50, psf60, psf80, psf100,
                                   psf200, psf300, psf500, psf750,
                                   psf1280, psf1920, psf2560, psf0-v1020,
                                   spare9, spare8, spare7, spare6,
                                   spare5, spare4, spare3, spare2,
                                   spare1},
      drx-RetransmissionTimer      ENUMERATED {
                                   psf1, psf2, psf4, psf6, psf8, psf16,
                                   psf24, psf33},
      longDRX-CycleStartOffset     CHOICE {
         sf10                  INTEGER(0..9),
         sf20                  INTEGER(0..19),
         sf32                  INTEGER(0..31),
         sf40                  INTEGER(0..39),
         sf64                  INTEGER(0..63),
         sf80                  INTEGER(0..79),
         sf128                 INTEGER(0..127),
         sf160                 INTEGER(0..159),
         sf256                 INTEGER(0..255),
         sf320                 INTEGER(0..319),
         sf512                 INTEGER(0..511),
         sf640                 INTEGER(0..639),
         sf1024                 INTEGER(0..1023),
         sf1280                 INTEGER(0..1279),
         sf2048                 INTEGER(0..2047),
         sf2560                 INTEGER(0..2559)
      },
      shortDRX                SEQUENCE {
         shortDRX-Cycle               ENUMERATED {
                                      sf2, sf5, sf8, sf10, sf16, sf20,
                                      sf32, sf40, sf64, sf80, sf128, sf160,
                                      sf256, sf320, sf512, sf640},
         drxShortCycleTimer            INTEGER (1..16)
      }     OPTIONAL                                    -- Need OR
      processActiveIndicator                BOOLEAN
   }
}

-- ASN1STOP
```

FIG. 6

DISCONTINUOUS RECEPTION IN A WIRELESS DEVICE FOR IN-DEVICE COEXISTENCE

BACKGROUND

Wireless devices continue to grow in capability and complexity. The next generation of wireless devices that are configured to operate in mobile networks are expected to be multi-radio devices that may include a wireless wide area network (WWAN) transceiver, a wireless local area network (WLAN) transceiver, a Bluetooth® transceiver, a global navigation satellite system (GNSS) receiver, and so forth. One challenge is allowing each of these transceivers and receivers to operate while avoiding interference between them.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 4b illustrates an abstract syntax notation (ASN) code example of assistance information communicated by a wireless device in accordance with an example;

FIG. 4c illustrates assistance information in accordance with an example;

FIG. 4d illustrates an ASN code example of extended DRX configuration information in accordance with an example;

FIG. 6 illustrates an ASN code example of a DRX configuration that includes a Boolean indicator in accordance with an example;

Figure 1:
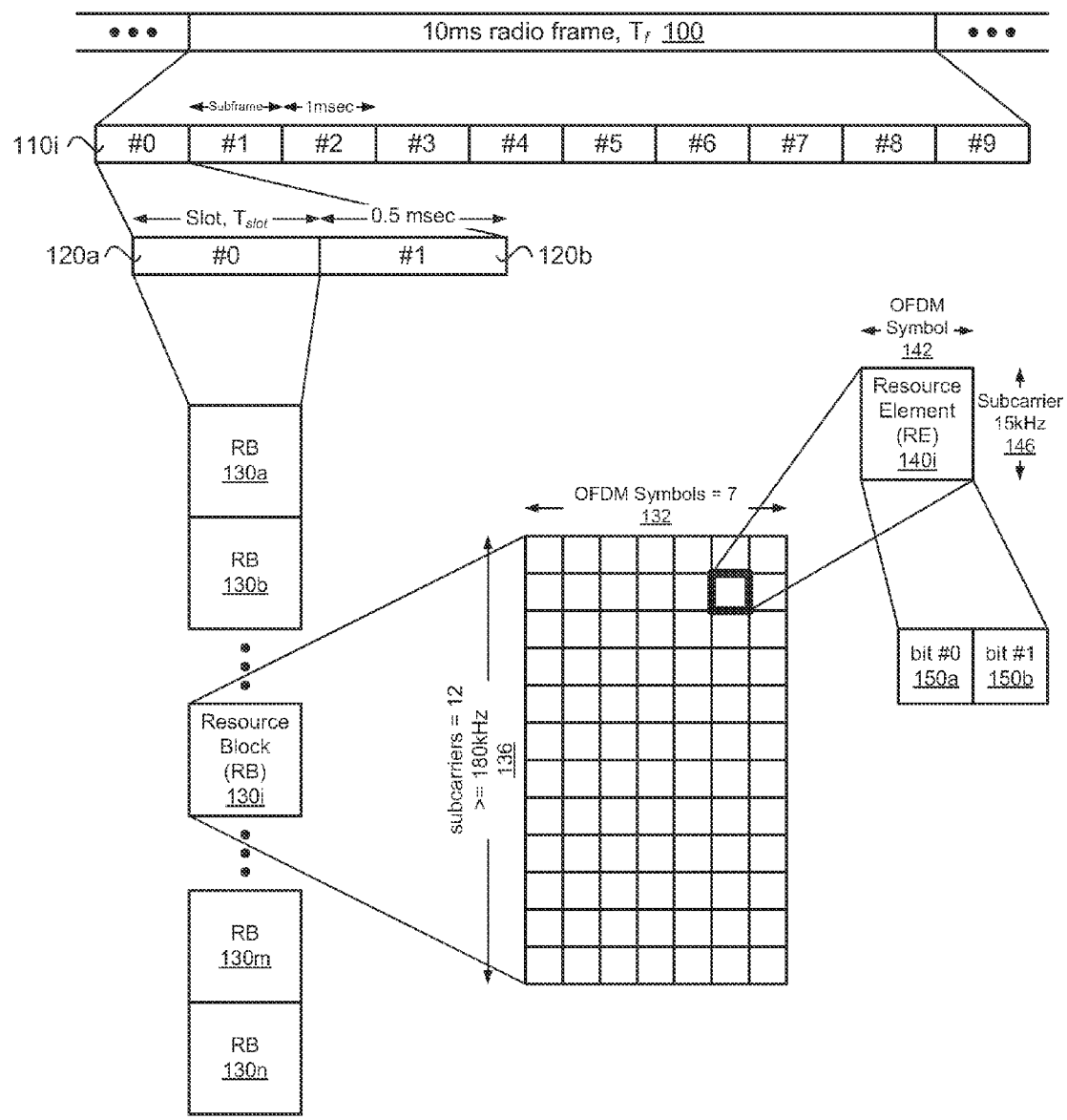
FIG. 1 illustrates a block diagram of an orthogonal frequency division multiple access (OFDMA) frame structure in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Many types of wireless devices can include multiple radios in each wireless device. For example, a wireless device may be equipped with a relatively high powered WWAN transceiver, such as a transceiver configured to operate based on a cellular type standard such as the third generation partnership project (3GPP) long term evolution (LTE) standard or another type of WWAN transceiver, and relatively low power transceivers such as a WLAN transceiver, a Bluetooth® transceiver, and/or a GNSS receiver. The WLAN transceiver, Bluetooth transceiver, and GNSS receiver are collectively referred to as low power transceivers since they typically operate (i.e. transmit and receive) at power levels that are significantly lower than the power levels used by the WWAN transceivers. Many types of low power transceivers operate in the Industrial, Scientific, and Medical (ISM) band and are therefore referred to as ISM transceivers. Other types of low power transceivers, configured for communication over relatively short distances, such as less than 100 meters, may also be included in a multi-radio device, as can be appreciated. One challenge is to determine how to avoid interference between the collocated transceivers and receiver. Interference between collocated transceivers and/or receivers is referred to herein as coexistence interference.

To reduce coexistence interference, there are several types of potential solutions. One potential solution is to use frequency division multiplexing (FDM) to move the signal from one transceiver further away in frequency from the signal of another transceiver, thereby creating more frequency separation. Another potential solution is the use of time division multiplexing (TDM) in which scheduling can be used so that when one transceiver is transmitting, another co-located transceiver is not simultaneously receiving. A radio frequency solution involves the use of radio frequency filtering which can be used to reduce the amount of out-of-bounds (OOB) emissions, using a filter at a transmitter, or blocking incoming out-of-bounds signals using a filter at a receiver. Power based solutions can be used to reduce transmission power, thereby potentially reducing the level of interference. Hybrid solutions are also possible by combining two or more of the previously presented solutions.

In a wireless wide area network such as the third generation partnership project (3GPP) long term evolution (LTE) network Release 8 in the fourth quarter of 2008, the concept of discontinuous reception (DRX) was introduced for saving power. DRX can be used to enable a wireless device, such as a user equipment (UE) in a 3GPP LTE network, to discontinuously monitor a control channel, such as the physical downlink control channel (PDCCH) communicated from a transmission station such as an enhanced NodeB (eNodeB). The discontinuous monitoring can provide significant power savings at the UE since the receiver at the UE can be turned off. The scheduling of a 3GPP LTE transceiver using DRX will be explained more fully below.

In addition to saving power, DRX can also be used to provide a TDM solution for reducing coexistence interference of co-located devices. For example, coexistence interference between a collocated 3GPP LTE configured transceiver (LTE) and a low power transceiver such as a Bluetooth® configured transceiver (BT) can be reduced, using DRX, by scheduling the BT transceiver to transmit when the LTE transceiver is not receiving. In one embodiment, the LTE transceiver can be configured to be turned off more often by reducing the amount of time that the monitors control channels, such as the physical downlink control channel (PDCCH).Another TDM solution is LTE denial, which can be used to handle short term industrial, scientific and medical (ISM) radio events. A short term ISM event is a communication by an ISM or low power transceiver in a multi-radio device that lasts for a relatively short period, such as from approximately 0.5 milliseconds (ms) to tens of milliseconds in length. In this solution, a wireless device such as a UE can autonomously deny LTE resources allocated by eNodeB due to some critical short-term events that may occur on the ISM side. For instance, a short-term event can involve one or more events that may occur during a BT/Wi-Fi connection-setup or other important signaling. Otherwise, a large delay or failure of a connection-setup could happen if these events are not prioritized over the transmission from the LTE transceiver. The LTE denial solution is assumed to be used for an event that does not frequently occur. LTE denial has the problem that it may impact the PDCCH and the physical uplink shared channel (PUSCH) link adaptation since an eNB cannot distinguish LTE denial from a PDCCH decoding error by the UE. Another drawback of LTE denial is that the allocated uplink resource can be wasted. In accordance with one embodiment of the present invention, a transient DRX configuration can be used to handle short term ISM events. The transient DRX configuration can eliminate the impact for link adaptation. In addition, the potential resource wasting of the allocated uplink can be significantly reduced, relative to the use of LTE denial. In another embodiment, Boolean operator, referred to herein as a processActiveIndicator can be included in a DRX configuration to disable the monitoring of PDCCH at the LTE transceiver. This can increase the time in which a collocated low power transceiver can operate. The embodiments and additional advantages will be discussed more fully below.

Discontinuous Reception

Discontinuous reception (DRX) is a process used in wireless communication to reduce power usage on a wireless device and reduce coexistence interference by providing known times for collocated transceivers or receivers to operate with respect to a higher powered transceiver, such as a WWAN transceiver. The WWAN transceiver in a wireless device can communicate with a transmission station, referred to as a network node, to negotiate time periods in which the wireless device will receive communications from the network node. During the negotiated times when information is not received, the wireless device can turn its receiver off and enter a low power state. Discontinuous reception is used in a number of different wireless communication standards, including but not limited to 3GPP LTE Rel. 8, 9, and 10 and the Institute of Electrical and Electronics Engineers (IEEE) 802.11 standard.

In the 3GPP LTE (LTE) standard, a set of functionalities are provided to enable an LTE configured receiver in a UE to perform sleep events. These sleep events may last anywhere from a single millisecond to hundreds of milliseconds or longer. The duration and timing of the sleep events can be negotiated between the UE and the network node. The negotiation may be performed using high level signaling, such as an Open Systems Interconnection (OSI) level 3 communication or another type of high level signaling. One example of an OSI level 3 communication in the 3GPP LTE standard is radio resource control (RRC) signaling. In the LTE standard, RRC signaling is used to control DRX operations at the LTE configured transceiver in the UE.

A brief description of the frame structure of the 3GPP LTE standard is provided herein as a reference. FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the transmitting station and the receiving station can include multiple resource blocks (RBs) 130$a$, 130$b$, 130$i$, 130$m$, and 130$n$ based on the CC frequency bandwidth. The CC can have a carrier frequency having a bandwidth and center frequency. Each RB (physical RB or PRB) 130$i$ can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

The network node in the 3GPP LTE standard is a node with which the UE has set up at least one component carrier. The network node may be a full power eNodeB, referred to as a macro node. Alternatively, the UE may be in communication with a low power node such as a femto node, pico node, or home eNodeB (HeNB). The UE may also communicate with a macro node or low power node via a relay node.

A UE can be set in either an RRC_IDLE or an RRC_CONNECTED state to extend battery life while still guaranteeing a high quality of service (QoS) and connectivity speed. The 3GPP LTE implementation allows the UE to reduce the amount of time spent monitoring a control channel, such as the PDCCH, for control channel information. Rather than monitoring the PDCCH every transmission time interval (TTI), the UE can monitor the PDCCH only during specific time intervals set through the RRC communication. An Active Time is a time related to DRX operation during which the UE monitors the PDCCH in PDCCH-subframes. This solution can provide benefits in both the downlink and uplink because all of the scheduling control information is transmitted on the PDCCH. During non-active states, the UE can be configured to enter a power saving state that can significantly decrease the power consumption of the LTE configured radio frequency modem at the UE, thereby reducing interference at collocated radios at the UE.

The RRC can be used to manage the use of DRX by setting various parameters. Examples of parameters that can be set in the RRC_CONNECTED state are illustrated in the following table.

| DRX Parameter | Description |
|---|---|
| DRX Cycle | Identifies the periodic repetition of an active period, identified as an "On Duration", followed by a possible period of inactivity. There is a DRX Long cycle and a DRX Short cycle. |
| On Duration timer | Identifies how many subframes the UE is in an active state when a new DRX cycle starts (at the beginning of a DRX cycle). The UE will listen to the PDCCH subframes during this time even if there is no data transfer. |
| DRX Inactivity timer | Identifies for how many consecutive PDCCH subframes the UE is to remain active after successfully decoding a PDCCH. |
| DRX Retransmission timer | Identifies a maximum number of consecutive PDCCH subframes in which the UE should remain active to wait for an incoming retransmission after a first available retransmission time. Can be used for asynchronous HARQ. |
| DRX Short Cycle | Identifies a periodic repetition of an active state when the UE is under a short DRX condition. |
| Short DRX Cycle timer | Specifies a consecutive number of subframes the UE will follow the short DRX cycle after the DRX inactivity timer has expired. |
| UL Retransmission Timer | Identifies number of subframes during which the UE shall monitor PDCCH when an UL grant for retransmission is expected. Timer is triggered 4 subframes after UL transmission. |
| DL Retransmission Timer | Identifies period during which the UE remains awake when retransmissions are expected on the PDSCH. |

When the network configures DRX for a UE, a value is defined for the DRX Inactivity Timer, referred to in the 3GPP LTE Technical Specification (TS) 36.321 as a drx-Inactivity Timer that starts running after each data block has been sent. If new data is sent then the timer is restarted. If still no data is sent when the timer expires then the device can enter a DRX mode with a short DRX cycle. This means that the UE will effectively sleep and awake in a relatively short pattern based on the short DRX cycle. If new data is received then it can be received relatively quickly since the UE only sleeps for short periods. The short DRX cycle mode also has a configurable short DRX cycle timer (i.e. drx-ShortCycleTimer) attached. Once this timer expires (i.e. no data is received during the short cycle mode), the UE can enter the long DRX cycle. The long DRX cycle can further reduce power usage, but also increases latency time.

During the inactivity periods, the UE may only check the control channels and resources may be assigned. In each DRX cycle (short and long), the RF modem can be turned on for a number of consecutive subframes set by the On Duration timer to listen to the control channel. When data activity is detected, in either the downlink or uplink, the eNodeB triggers the short DRX cycle for the UE, thereby increasing the responsiveness and connectivity of the UE. The transitions between the Long DRX Cycle and the Short DRC cycle may be triggered directly by the eNodeB or determined by a timer.

The inactivity timer can specify the consecutive number of TTIs during which the UE will monitor the PDCCH after successfully decoding a PDCCH indicating an uplink or a downlink data transfer for the UE. The inactivity timer can keep the UE awake for a certain period during data transfer even if the on-duration timer has expired. In a downlink, the inactivity timer is usually triggered within an on-duration period. If the on-duration period is longer, the inactivity timer may start and expire within the awake period. In this example, the inactivity timer will not contribute to the average awake time of the terminal. The inactivity timer may only be triggered for new transmissions in both an uplink and downlink and not for retransmissions.

Figure 2A:
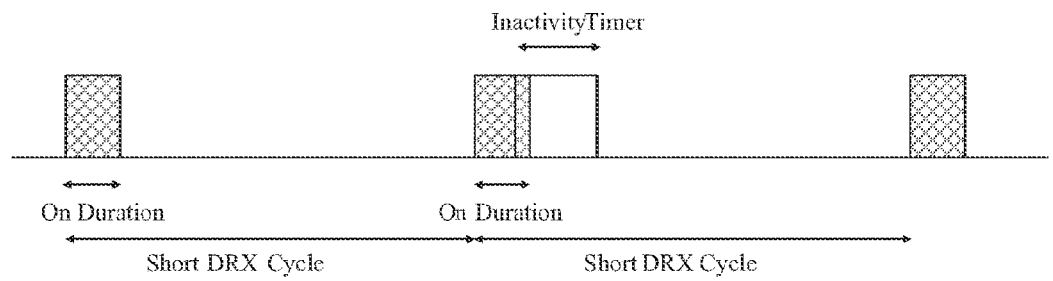
FIG. 2a illustrates a block timing diagram that includes a short discontinuous reception (DRX) cycle in accordance with an example

FIG. 2a illustrates one example of DRX parameters. In this example, a short DRX cycle starts at the beginning of an On Duration and ends at the beginning of the next On Duration. An Inactivity Timer is shown overlapping an On Duration, as discussed in the preceding paragraph.

Another DRX feature is related to power saving during HARQ retransmissions. For example, when a UE fails to decode a transport block of a HARQ active process, the UE assumes that the next retransmission will take place after a DRX retransmission timer. This allows the UE to enter a power saving state without the need to listen to the PDCCH.

In the 3GPP LTE specification, a HARQ round trip time (RTT) timer can be started after 1 ms (for decoding delay) of the PDCCH indicating a downlink shared channel (PDSCH) transmission. The HARQ RTT timer can be started for every downlink shared channel transmission.

Figure 2B:
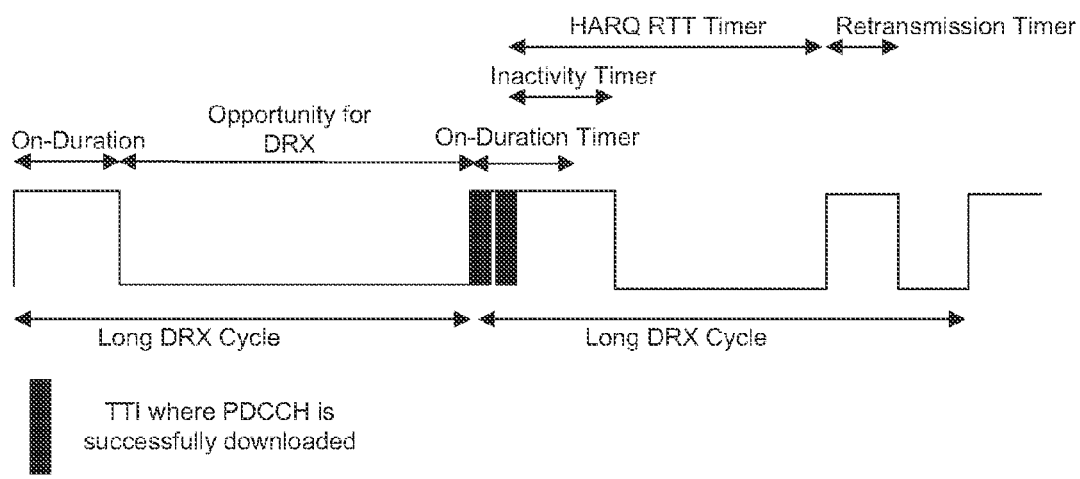
FIG. 2b illustrates a block timing diagram that includes a long DRX cycle in accordance with an example

FIG. 2b illustrates an example of a long DRX cycle. In this example, the long DRX cycle is shown relative to an On-Duration Timer, an overlapping Inactivity Timer, a HARQ RTT timer, and a retransmission timer. The HARQ RTT timer is started after the decoding delay of the PDCCH.

Figure 3:
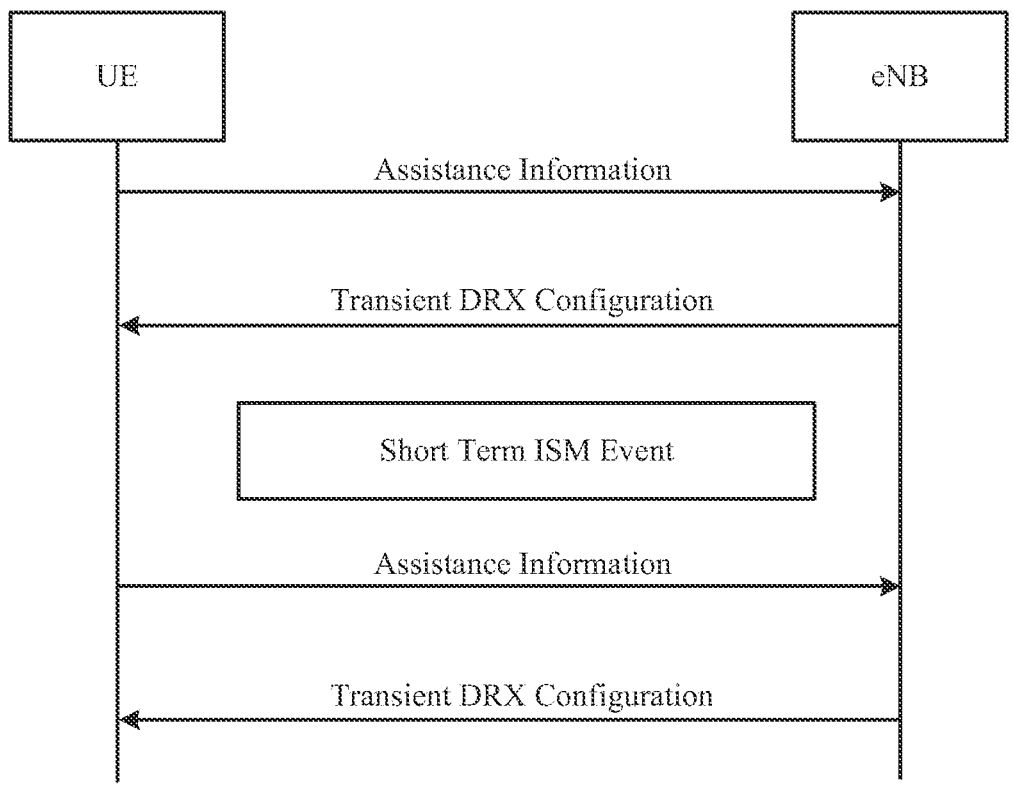
FIG. 3 illustrates a block diagram of a transient DRX configuration setup in accordance with an example.

FIG. 3 illustrates a block diagram showing a transient DRX configuration setup to support in-device coexistence for short term ISM events. An ISM event, as used herein, is a communication from a collocated transceiver that communicates (i.e. transmits and/or receives) in the ISM band. The term transient DRX configuration refers to a temporary DRX configuration. Previously, a DRX configuration is considered to be applicable until a new configuration is received. In a transient DRX configuration, the DRX configuration is valid for one or multiple DRX cycles. The length in which the configuration is valid can be communicated using high level signaling, such as radio resource control (RRC) signaling. Once the configuration length has passed, the DRX configuration can be automatically released.

As shown in FIG. 3, before a short term ISM event occurs, a wireless device, such as a UE, can send "assistance information" to an eNodeB. Such information can include:

A periodicity of a time division multiplexing (TDM) pattern;
A scheduling period (or unscheduled period); and
A duration for a TDM solution to be applicable.

The eNodeB can then configure DRX parameters for the LTE modem including a periodicity and a scheduling period. The periodicity can be a TDM pattern periodicity. The periodicity may be set with respect to a number of subframes, such as SF10 referring to 10 subframes, sf20 referring to 20 subframes, and so on. The scheduling period can be the duration for the LTE transmission/reception to occur. This scheduling period is referred to as an LTE scheduling period and can be allocated or measured in a unit of subframes.

When the short term ISM event is finished, the UE can send assistance information to the eNodeB again, as shown in FIG. 3. The eNodeB can then send a reconfiguration message to the UE. However, these messages are typically not needed. By eliminating these messages, significant control signaling overhead can be saved.

Figure 4A:
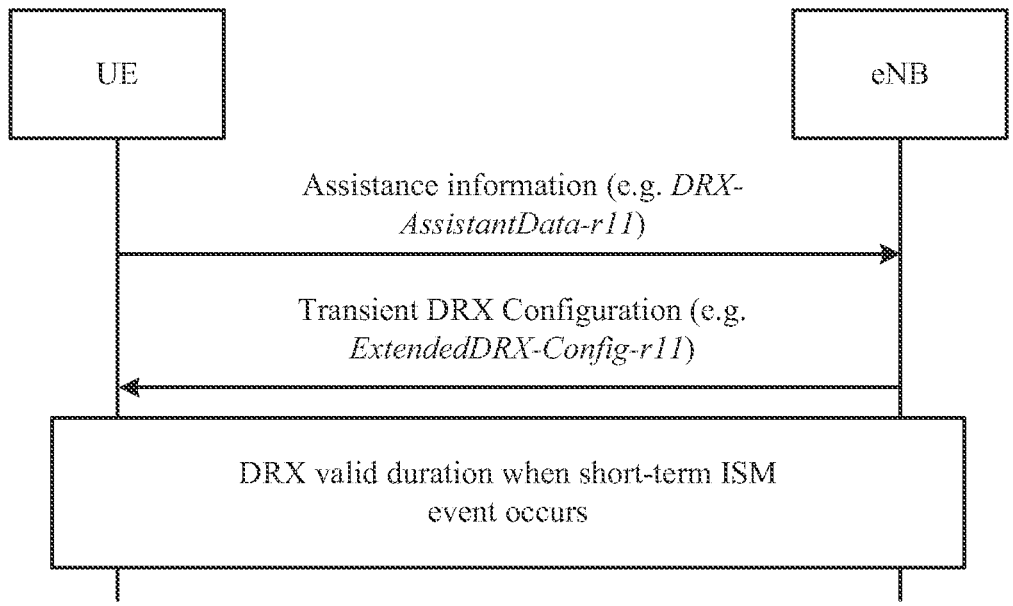
FIG. 4a illustrates a block diagram of an extended transient DRX configuration setup in accordance with an example.

In accordance with one embodiment of the present invention, rather than sending assistance information and a reconfiguration message after the ISM event has occurred, a time period referred to as a "DRX valid duration" can be used to identify how long the DRX should remain valid, as illustrated in FIG. 4a.

In the embodiment of FIG. 4a, assistance information, such as DRX-AssistantData-r11 can be communicated from the UE to the eNodeB. FIG. 4b illustrates one example of DRX-AssistantData-r11 field descriptions. The eNodeB can then communicate transient DRX configuration information, such as ExtendedDRX-Config-r11 information.

After receiving the UE's assistance information, the eNodeB can configure the DRX for a selected duration. Such a selected duration can be indicated as the number of DRX cycles. In one embodiment, the selected duration can be a set number of long DRX cycles. However, different time periods may be used as well, such as short DRX cycles or other identifiable time periods. After the DRX selected duration, the DRX configuration can be automatically released, as previously discussed. The length of the selected duration can depend on the characteristics of the short term ISM event.

One significant advantage of the use of the DRX valid duration for short-term ISM events is that there is no link adaptation and uplink resource waste issue compared with an LTE denial solution. When compared with a DRX solution recited in the 3GPP LTE Rel. 10 specification, the use of the DRX valid duration for short-term ISM events provides significant savings of control signaling overhead. The DRX valid duration does away with the need to communicate additional assistance information and reconfiguration information after the short-term ISM event occurs, as is shown in FIG. 3a.

One example of Abstract Syntax Notation One (ASN.1) code for UE assistance information is illustrated in FIG. 4b. Both the periodicity and the scheduling period of the LTE modem can be selected based on an integer number of subframes. The DRX valid duration can be selected as an integer number of DRX cycles. In this example the integer number is selected between 1 and 8 DRX cycles. However, this is not intended to be limiting. The DRX valid duration may be greater than 8 DRX cycles, depending on the type of system in use. The selected integer value can be selected to allow the DRX cycles to operate for a length of time that is longer than the short term ISM event.

An example of ASN.1 code for a configuration of an eNodeB is illustrated in FIG. 4d. The DRX-Config information element (IE) in the 3GPP LTE Rel. 10 specification cannot be extended. Accordingly, the valid duration may be implemented in an extension of the DRX-Config IE. The onDurationTimer can be selected to have a value from a single subframe up to 200 subframes in this example. Similarly, the DRX-InactivityTimer allows selections from one subframe to 2560 subframes, with 9 spare locations to allow other selections. The DRX-Retransmission timer can be selected from 1 subframe to 33 subframes. The longDRX-CycleStartOffset allows an offset to be selected in the Long DRX cycle that is anywhere from the first (i.e. 0) subframe, up to subframe 2559. The shortDRX-Cycle can be selected to have a length from 2 subframes up to 640 subframes. A DRXShortCycleTimer can be selected to be an integer of the shortDRX-Cycle. The additional field valid duration is illustrated as being underlined in FIG. 4d. The description of the valid duration is the same as it is with respect to FIG. 4b, as described in the previous paragraphs. Accordingly, in this example, the validDuration can be an integer multiple of the TDM pattern periodicity, which is measured in subframes.

As previously discussed, DRX can also be used to provide a TDM solution for reducing coexistence interference of co-located LTE and collocated low power transceivers. In one embodiment, an additional Boolean operator, referred to herein as a "processActiveIndicator" can be included in the DRX configuration information.

When the processActiveIndicator is set to true then the DRX operation can continue as previously defined in the 3GPP LTE Rel. 10 specification. However, when the processActiveIndicator is set to false, the LTE transceiver in the multi-radio device can be configured such that the PDDCH subframes will not be monitored for potential retransmissions.

Figure 5:
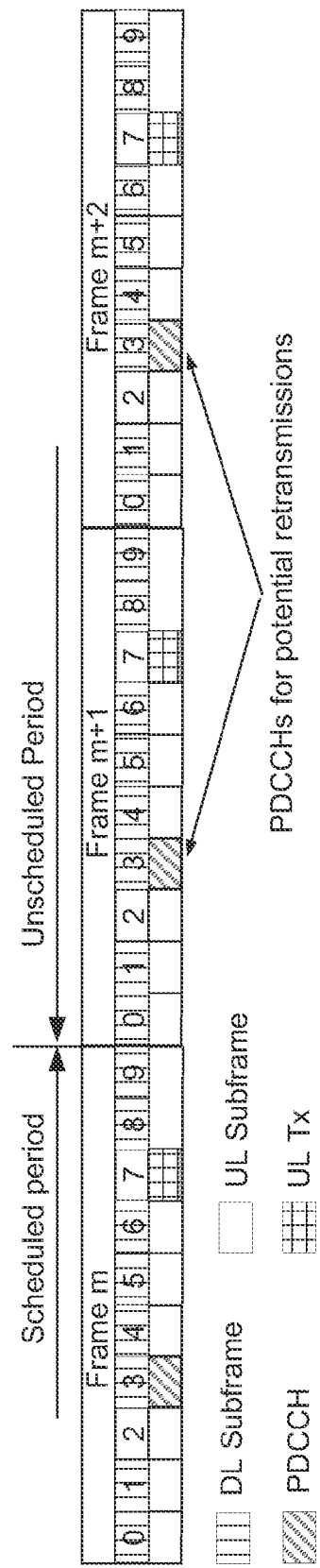
FIG. 5 illustrates a block diagram of physical downlink control channels occurring in a DRX scheduled period and unscheduled period in accordance with an example.

For example, FIG. 5 shows a block diagram of a plurality of frames in an LTE transmission from an eNodeB to a UE. In this example, there are three frames, labeled m, m+1, and m+2. The DRX in this example is configured such that this is a scheduled period, wherein the LTE can transmit and receive. In subframe 3, the PDCCH is received in a downlink from the eNodeB. In frames m+1 and m+2, the LTE transceiver is typically configured to monitor the PDCCH subframes for potential retransmissions based on the DRX defined in the 3GPP LTE Rel. 10 specification. However, the eNodeB can set the processActiveIndicator to false. When this setting is received at the UE, the UE can be configured so that it no longer monitors the PDCCHs for pending uplink retransmissions during the unscheduled period, thereby decreasing the power usage and increasing the amount of time for the collocated radios in the multi-radio device to communicate with little or no interference from the LTE transceiver.

There are seven different uplink/downlink (UL/DL) configurations in LTE for TDD. Each configuration provides a different number of uplink (U) subframes, downlink (D) subframes, and special (S) subframes in each frame. The special subframes can comprise a downlink pilot time slot, a guard period, and an uplink pilot time slot. The UL/DL configurations for LTE are illustrated in the following table.

| Uplink-downlink configuration | Downlink to uplink switch periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

| Uplink-downlink configuration | Downlink to uplink switch periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The processActiveIndicator can be used in each of the UL/DL TDD configurations, as well as in frequency division duplexing (FDD) to disable the monitoring of PDCCHs for pending uplink retransmissions during unscheduled period.

The following changes can be made to the 3GPP LTE Rel. 10 to introduce the enhancement into the 3GPP specifications. For the 3GPP Technical Specification (TS) 36.331 V. 10.4.0 (2011 December), a Boolean operator called processActiveIndicator can be introduced. When the Boolean operator is true, the LTE transceiver can monitor PDCCHs during the scheduled period and can monitor for pending uplink retransmissions during the unscheduled periods.

When the Boolean operator processActiveIndicator is set to false, then the UE can be configured so that it does not monitor the PDCCHs for pending uplink retransmissions during an unscheduled period, as previously discussed.

In one embodiment, the processActiveIndicator can be added as an extension of DRX-Config. One example of the DRX-Config that includes the processActiveIndicator is illustrated in FIG. 6. The changes to the DRX-Config are highlighted in underline, showing the Boolean operator. The DRX-Config can be part of a MAC-MainConfig information element that is defined in the 3GPP TS 36.331 V. 10.4.0 (2011 December) and is used to specify the MAC main configuration for signaling and data radio bearers.

For 3GPP TS 36.321 V10.4.0 (2011 December), section 5.7, the following addition can be made, with the changes highlighted in underline:

When a DRX cycle is configured, the Active Time includes the time while:
  onDurationTimer or drx-InactivityTimer or drx-Retransmission Timer or mac-ContentionResolution-Timer (as described in 3GPP TS 36.321 subclause 5.1.5) is running; or
  a Scheduling Request is sent on PUCCH and is pending (as described in 3GPP TS 36.321 subclause 5.4.4); or
  an uplink grant for a pending HARQ retransmission can occur, processActiveIndicator in ExtendedDRX-Config-r11 is true, and there is data in the corresponding HARQ buffer; or
  a PDCCH indicating a new transmission addressed to the C-RNTI of the UE has not been received after successful reception of a Random Access Response for the preamble not selected by the UE (as described in 3GPP TS 36.321 subclause 5.1.4), These additions to the 3GPP LTE specification can enable DRX to be used in a communication system configured to operate based on the 3GPP LTE specification. By configuring the UE so that it does not monitor the PDCCHs for pending uplink retransmissions during an unscheduled period, it significantly increases the amount of time that a low power transceiver in a multi-radio device can communicate, thereby decreasing the amount of coexistence interference.

In one embodiment, the eNodeB can communicate that the processActiveIndicator is false when the UE communicates that there is coexistence interference occurring.

Figure 7:
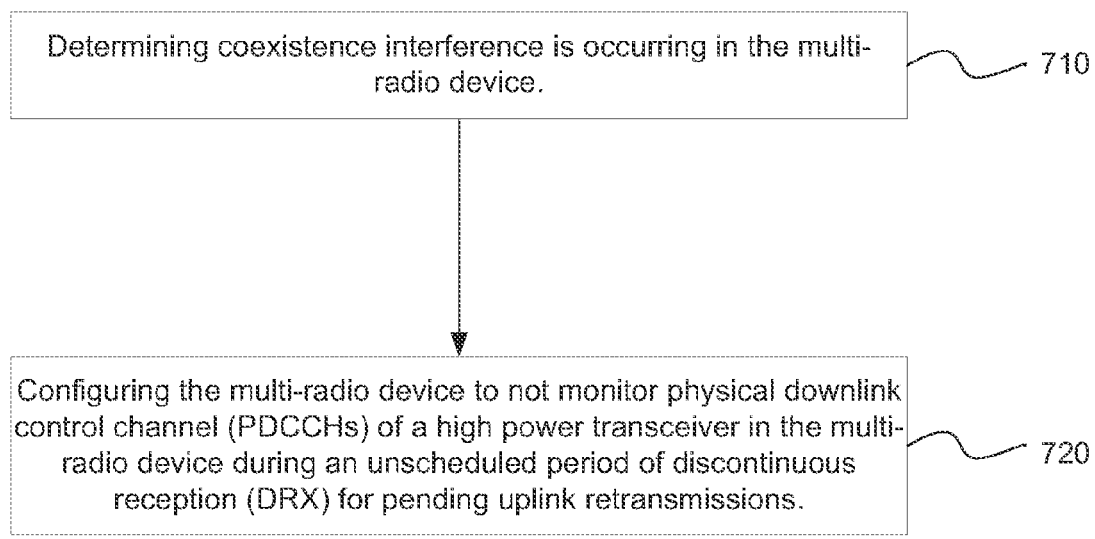
FIG. 7 depicts a flow chart of a method 600 for providing discontinuous reception in a multi-radio wireless device in accordance with an example.

In one embodiment, a method 700 for reducing coexistence interference in a multi-radio wireless device is disclosed, as shown in FIG. 7. The method comprises determining coexistence interference is occurring in the multi-radio device, as shown in block 710. A further operation comprises configuring the multi-radio device to not monitor physical downlink control channel (PDCCHs) of a high power transceiver in the multi-radio device during an unscheduled period of discontinuous reception (DRX) for pending uplink retransmissions, as shown in block 720.

Figure 8:
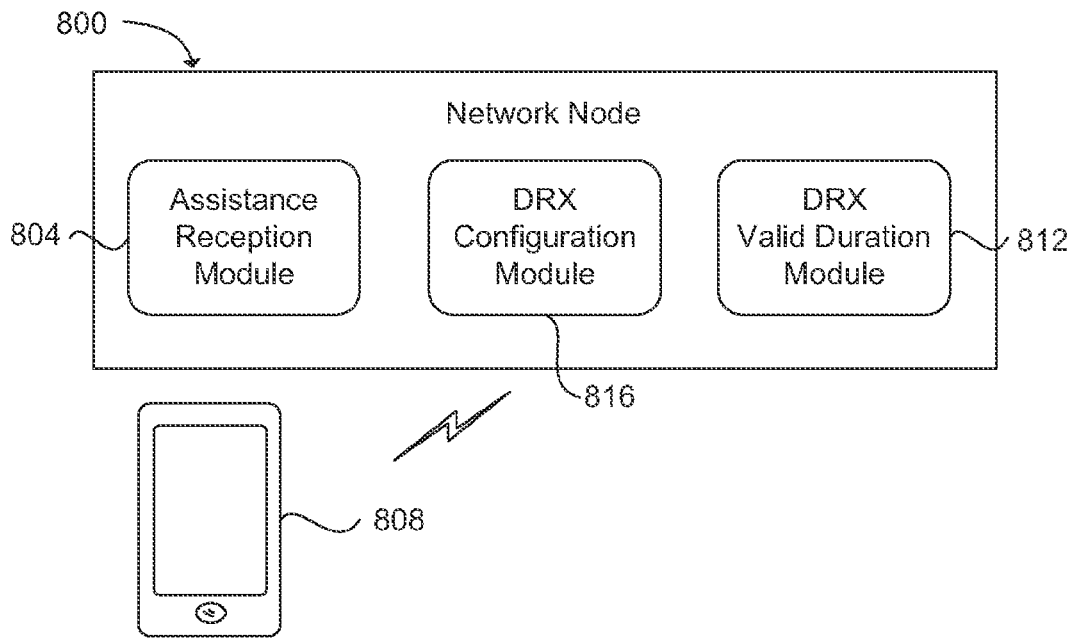
FIG. 8 illustrates a block diagram of a network node in accordance with an example.

In another embodiment, a network node 800 is illustrated in the block diagram of FIG. 8, in accordance with an embodiment of the present invention. The network node comprises an assistance reception module 804 coupled to the network node. The assistance reception module is configured to receive assistance information from a wireless device 808. The assistance information includes a periodicity value of a time division multiplexing (TDM) pattern for which the wireless device is configured to communicate with the network node. A DRX valid duration module 812 is coupled to the network node and configured to set a DRX valid duration. The DRX valid duration can be an integer multiple of the periodicity value of the TDM pattern. A DRX configuration module 816 can be coupled to the network node and is configured to communicate DRX information to the wireless device 808 to configure the wireless device to provide DRX. The DRX information can include the DRX valid duration.

Figure 9:
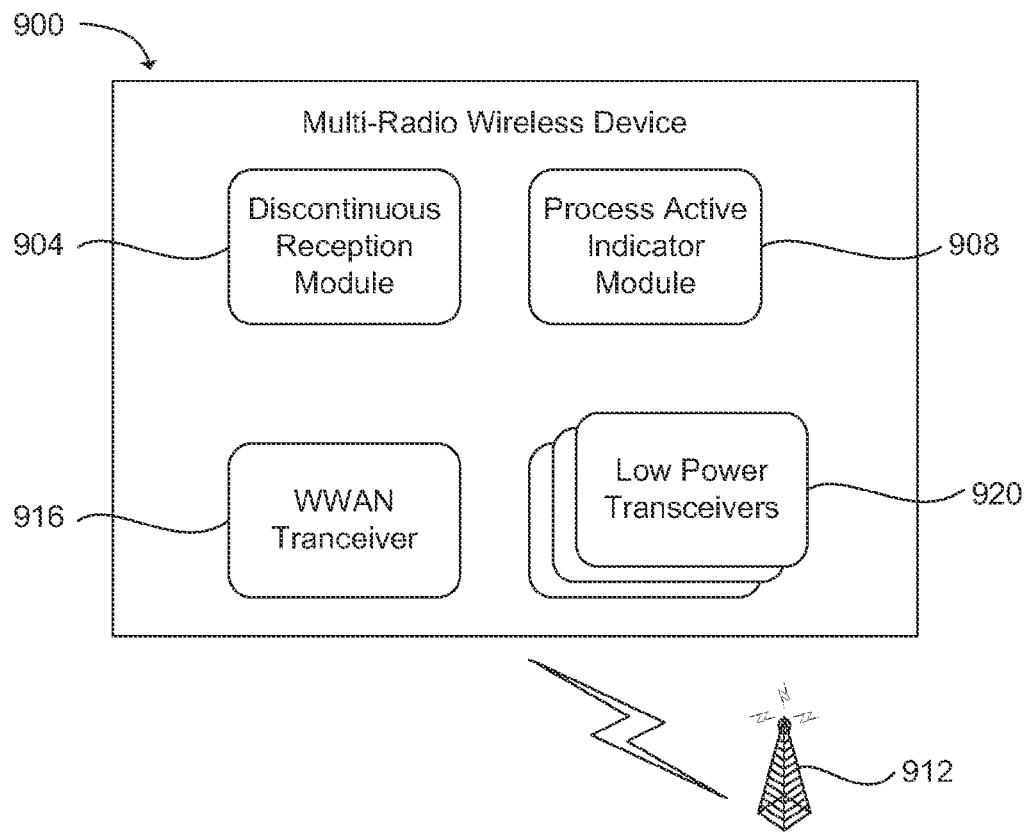
FIG. 9 illustrates a block diagram of a multi-radio wireless device in accordance with an example.

In another embodiment, a multi-radio wireless device 900 configured for discontinuous reception is illustrated in a block diagram of FIG. 9 in accordance with an embodiment of the present invention. The multi-radio wireless device can include a discontinuous reception (DRX) module 904 configured to receive discontinuous reception configuration information elements (IE) from an eNodeB 912. A process active indicator module 908 configured to identify when to monitor physical downlink control channel (PDCCHs) of a wireless wide area network (WWAN) transceiver 916 in the multi-radio device for pending uplink retransmissions during an unscheduled period of discontinuous reception (DRX). The multi-radio wireless device can also include at least one low power transceiver 920 that is configured to receive data when the WWAN transceiver 916 in the multi-radio device 904 does not monitor the PDCCHs for pending uplink retransmissions during the unscheduled period of the DRX.

Figure 10:
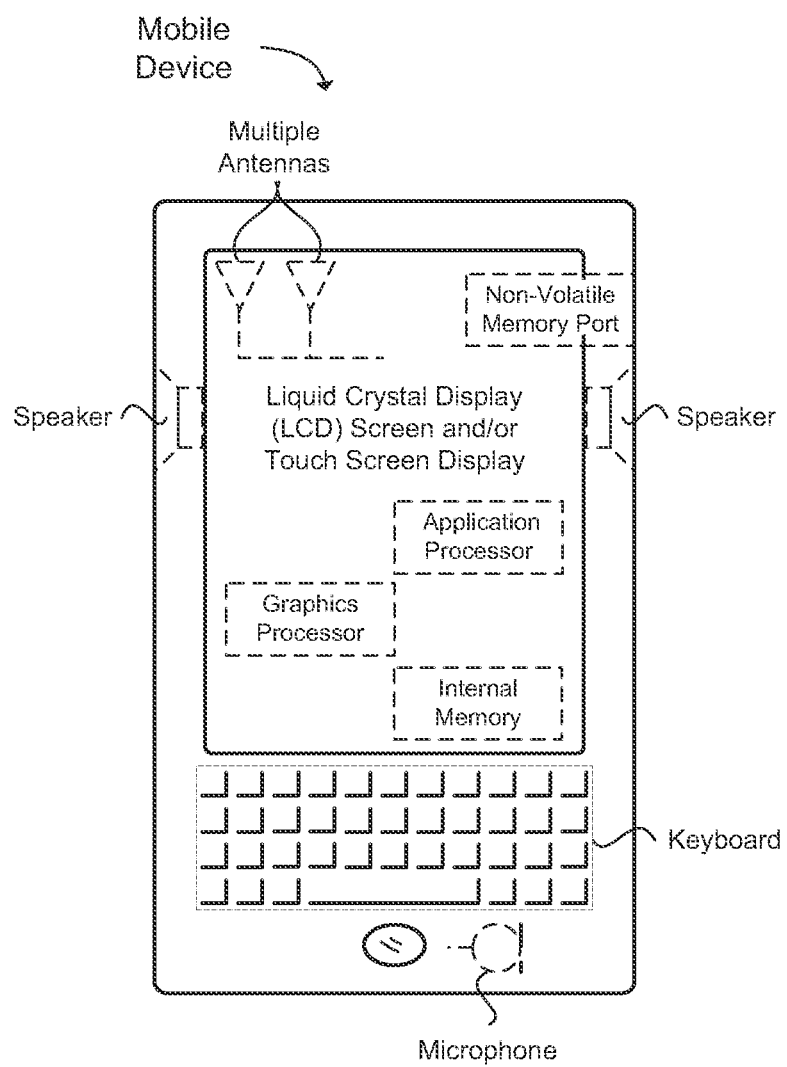
FIG. 10 illustrates a block diagram of a mobile device, in accordance with an example.

FIG. 10 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 10 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for reducing coexistence interference in a multi-radio wireless device, comprising:
   determining the coexistence interference is occurring in the multi-radio device, wherein the multi-radio device includes a wireless wide area network (WWAN) transceiver that operates using discontinuous reception (DRX);

receiving a message from an eNodeB in a DRX configuration information element (IE) using radio resource control (RRC) signaling, wherein the message includes a Boolean indicating whether the PDCCHs of the WWAN transceiver in the multi-radio device are being monitored for the pending uplink retransmissions during the unscheduled period of the DRX;

configuring the multi-radio device to not monitor physical downlink control channel (PDCCHs) of the WWAN transceiver in the multi-radio device during an unscheduled period of discontinuous reception (DRX) for pending uplink retransmissions, wherein the Boolean in the DRX configuration IE is used to enable or disable monitoring of the PDCCH of the WWAN transceiver for pending uplink retransmissions during the unscheduled period; and scheduling low power transceivers in the multi-radio device to receive during periods corresponding with PDCCH subframes of the WWAN transceiver to reduce coexistence interference between the low power transceivers and the WWAN transceiver.

2. The method of claim 1, further comprising configuring the multi-radio device to not monitor the PDCCHs of the WWAN transceiver during PDCCH subframes, wherein the WWAN transceiver is configured to operate based on a cellular type standard.

3. The method of claim 1, further comprising scheduling the low power transceivers to receive during periods corresponding with the PDCCH subframes, wherein the low power transceivers are configured to communicate in an industrial, scientific, and medical (ISM) band.

4. A multi-radio wireless device configured for discontinuous reception, comprising:

a discontinuous reception (DRX) module configured to receive discontinuous reception configuration information elements (IE) from an eNodeB, wherein the IE includes a Boolean indicating whether the PDCCHs of a WWAN transceiver in the multi-radio device are monitored for the pending uplink retransmissions during the unscheduled period of the DRX; and a process active indicator module configured to identify when to monitor physical downlink control channel (PDCCHs) of a wireless wide area network (WWAN) transceiver in a multi-radio device for pending uplink retransmissions during an unscheduled period of discontinuous reception (DRX);

at least one low power transceiver that is configured to receive when the WWAN transceiver in the multi-radio device does not monitor the PDCCHs for pending uplink retransmissions during the unscheduled period of the DRX, wherein the Boolean in the DRX configuration IE is used to enable or disable monitoring of the PDCCH of the WWAN transceiver for pending uplink retransmissions during the unscheduled period.

5. The multi-radio wireless device of claim 4, wherein the WWAN transceiver is configured to operate based on a cellular type standard.

6. The multi-radio wireless device of claim 4, wherein at least one of the at least one low power transceivers is configured to operate in an industrial, scientific, and medical (ISM) band.

7. The multi-radio wireless device of claim 4, wherein the DRX IE is received via radio resource communication (RRC) signaling.

* * * * *